United States Patent [19]

Okazawa et al.

[11] Patent Number: 5,034,733
[45] Date of Patent: Jul. 23, 1991

[54] METHOD AND APPARATUS FOR ROTATING DOTS DATA

[75] Inventors: Koichi Okazawa; Yasuo Kurosu; Yoshihiro Yokoyama; Nobuaki Izuno, all of Yokohama; Tamon Masimo, Hiratsuka, all of Japan

[73] Assignee: Hitachi, Ltd., Tokyo, Japan

[21] Appl. No.: 271,275

[22] Filed: Nov. 15, 1988

[30] Foreign Application Priority Data

Nov. 20, 1987 [JP] Japan .............................. 62-292077

[51] Int. Cl.$^5$ .................................................. G09G 1/06
[52] U.S. Cl. .................................... 340/727; 340/724; 340/790; 382/46
[58] Field of Search ............... 340/724, 727, 747, 750, 340/790, 720, 723; 364/518, 519, 521; 382/46

[56] References Cited

U.S. PATENT DOCUMENTS

| | | | |
|---|---|---|---|
| 4,542,377 | 9/1985 | Hagen et al. | 340/727 |
| 4,636,783 | 1/1987 | Omachi | 340/727 |
| 4,716,533 | 12/1987 | Ohmori | 340/724 |
| 4,729,107 | 3/1988 | Hasegawa et al. | 340/727 |
| 4,831,368 | 5/1989 | Masimo et al. | 340/727 |
| 4,837,845 | 6/1989 | Pruett et al. | 340/727 |

*Primary Examiner*—Jeffery A. Brier
*Assistant Examiner*—M. Fatahiyar
*Attorney, Agent, or Firm*—Antonelli, Terry, Stout & Kraus

[57] ABSTRACT

An image data rotating apparatus has an $n \times n$ dot matrix memory which temporarily stores $n \times n$ dots of image data supplied from a first image data memory. A row/column selector selects one row or column of the $n \times n$ dot matrix memory in response to a rotation indicating signal, which selects an integer times 90° as a rotating degree, for example, 0°, 90°, 180°, 270° or the like. The n dots of image data stored in the selected row or colum are re-written by outputting the stored data into a second image data memory, and by inputting another n dots of image data from the first image data memory in the same cycle, and with the repeating of this cycle, all the $n \times n$ dots of image data stored in the $n \times n$ dot matrix memory are re-written so that the rotated image data can be retrieved from the second image data memory.

15 Claims, 6 Drawing Sheets

METHOD AND APPARATUS FOR ROTATING DOTS DATA

BACKGROUND OF THE INVENTION

The present invention relates to a method and apparatus for rotating dots of data so as to easily edit and/or display rotated dots of data with a small circuit.

In the prior art, for example, in Japanese Patent Laid-open No. 59-60490 (1984) there is disclosed an apparatus in which there is an n×n dot matrix memory and a plurality of selectors for rotating outputs of the memory by 90°, 180°, 270°, etc., and an input direction of n dots of parallel data into the memory is limited to only one direction, that is, a to row direction or a column direction.

In this prior art, in order to rotate n×n dots of data, it is necessary to write n dots of parallel data n times into the memory, and to read n dots of parallel data n times from the memory. Namely, assuming that the n dots of parallel data make up one word, and the input and output operation of one word of data constitutes one cycle, 2n cycles are needed for rotating n words of image data. Since it is generally necessary to execute operations of n words of data by n cycles for processing image data in real time, it is impossible to process them in real time in this prior art.

Further, in variations of the above prior art, it is well known as a double-buffer method that a pair of matrix memories can be prepared, and a store to one memory and a read out from another memory can be simultaneously executed in the real time. However, in this double-buffer method, it is essentially necessary to use two $n^2$ bit memories, so that the circuit configuration becomes larger.

SUMMARY OF THE INVENTION

It is an object of the present invention to provide a method for rotating dots of data by m×90° degrees, where m is an integer in real time.

It is another object of the present invention to provide an apparatus for rotating dots of data in real time with a small capacity memory.

It is further another object of the present invention to provide an electronic display system using an apparatus for rotating dots of image data to be displayed.

In order to attain the above objects of the present invention, a row or column of an n×n dot matrix memory means is sequentially selected in response to a designated rotating degree, which is an integer of 90°, n dots data are read out from of the selected row or column of the n×n dot matrix memory means and another n dots of data are input into the n×n dot matrix memory means by a read modify write execution, and the read out data are sequentially stored into a memory, so that the dots of data can be rotated by m×90°, where m is an integer in real time.

In the present invention, in order to rotate image data with an n×n dot matrix memory means in real time, a select means selects a voluntary row or column of the n×n dot matrix memory means and input/output means outputs n dots of data of the dot matrix from the matrix memory means and inputs another n dots of data into the matrix memory means by a read modify write operation, so that data of the voluntary row or column of the matrix memory can be read out and written in real time.

Further, in the present invention, the apparatus for rotating dots of image data is connected between a first image memory and a second image memory, the first image memory stores the image data which is delivered from a host computer, etc., and is input into the n×n dot matrix memory means, and the second image memory stores the image data rotated by m×90°, where m is an integer, which is output from the n×n dot matrix memory means.

Concerning relevant former U.S. applications of this type of apparatus, we filed Kurosu et al, U.S. Ser. No. 186,162, "Electronic Filing Device", on Apr. 26, 1988, Izuno et al, (U.S. Ser. No. 184,394, now U.S. Pat. No. 4,943,857) "Synchronizing Circuit For An External Signal And An Internal Sampling Clock Signal", on Apr. 21, 1988, and Mashimo et al, U.S. Ser. No. 063,104, "Display Apparatus With Rotatable Display Screen", on Jan. 4, 1986.

DETAILED DESCIPTION OF THE PREFERRED EMBODIMENTS

First, prior to explaining embodiments of the present invention, a principle of the present invention will be described by referring to FIGS. 4A, 4B, 5A, 5B and 5C. In an example to be described hereinafter, the rotation is a left 90° rotation of an image data, and n of the image data matrix is equal to 3. In FIGS. 4A, 4B, 5A, 5B, and 5C, "1, 2, 3, 4, 5, 6, 7, 8, 9, A, B, C, D, E, F, G, H, i, and α, β, γ, δ, ε, ζ, η, θ, and ι" indicate a specific picture element, respectively.

Figures 4A, 4B, 5A, 5B, 5C:
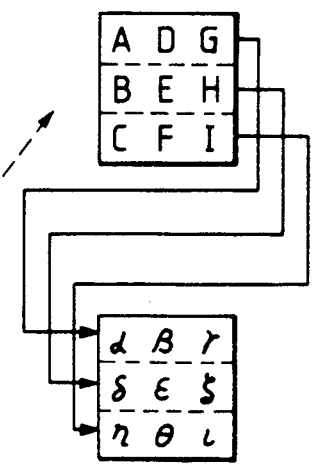
FIGS. 4A and 4B illustrate data elements stored in a matrix memory for explaining a principle of the present invention.
FIGS. 5A to 5C illustrate a read/write operation of the data elements stored in the matrix memory for explaining a principle of the present invention.

By the left 90° rotation, the image data shown in FIG. 4A will have to be re-arranged as shown in FIG. 4B. In a rotation by a 3×3 dot unit, three word data, for example, "1 2 3", "4 5 6" and "7 8 9" have to be re-arranged into "1 4 7", "2 5 8" and "3 6 9". In the present invention, the original data "1 2 3", "4 5 6" and "7 8 9" are written in a row direction of a 3×3 dot matrix-type memory. Next, a read-modify-write operation is executed by accessing the matrix memory in a column direction. Namely, as shown in FIG. 5B, "1 4 7" is read out and "A B C" is stored, "2 5 8" is read out and "D E F" is stored, and "3 6 9" is read out and "G H i" is stored. As a result, the read out of the left 90° rotated "1 4 7", "2 5 8" and "3 6 9", and the store of the data "A B C", "D E F" and "G H i", which will be rotated in the next operation, are executed in only 3 cycles. In the following step, the access direction changes back to the row direction, and as being apparent from FIG. 5C, the read out of "A D G", "B E H" and "G F i" and the store of "α β γ", "δ ε ζ" and "η θ ι" are executed in 3 cycles. By repeating these operations, it becomes possible to process the left 90° rotation of the image data by an $n^2$ matrix memory in real time. Also, it is possible to rotate the image data left by 180°, left by 270° (that is, right by 90°), and so on, as will be explained later with reference to the present invention.

Figure 1:
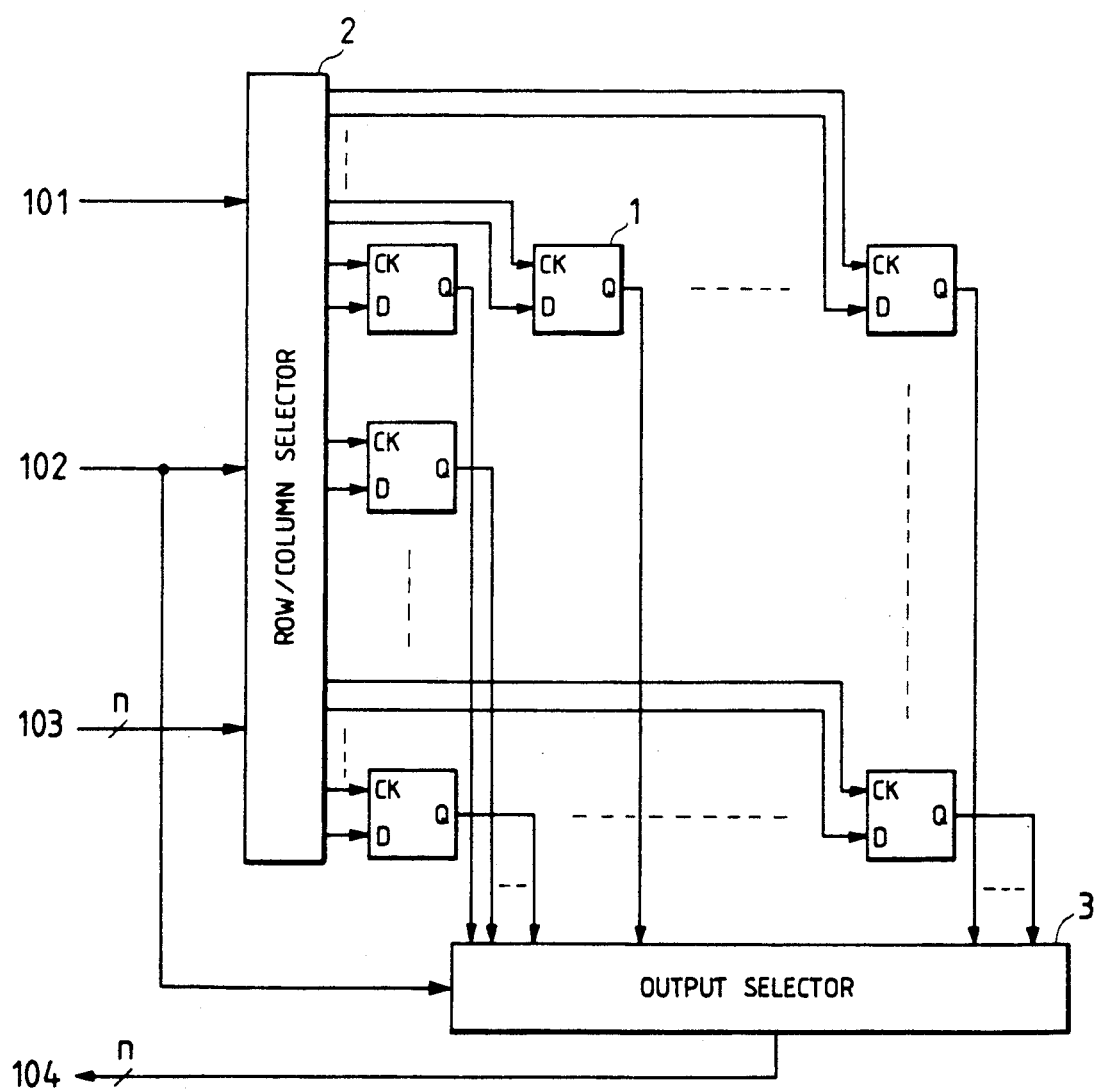
FIG. 1 shows an embodiment of a data rotating circuit of the present invention.

Second, embodiments of the present invention will be explained with FIGS. 1, 2 and 3, hereinafter. FIG. 1 shows an embodiment of a data rotating circuit using an n×n matrix memory. In FIG. 1, numerals 1, 2 and 3 denote an n×n dot matrix memory, a row/column selector, and an output selector, respectively. The row/column selector 2 receives n bits of input data 103, a write clock 101, and a row/column select signal 102. The row/column select signal 102 is supplied to the output selector 3, also. When the row/column select signal 102 is provided, the output selector 3 selects outputs of the designated row or column of the matrix memory 1, and outputs n bits of output data 104.

Next, the row/column selector 2 re-arranges the n bits of input data 103 in the row or column direction in response to the row/column select signal 102. Since the outputs of the designated row or column of the matrix memory 1 are output into an outer circuit (which will be explained later), it is possible to read out the data stored in the designated row or column, and to re-write another n bits of input data into the designated row or column of the matrix memory 1 in the same cycle by sending the write clock 101 to the designated row or column. As a result, a read-modify-write operation of one word data is executed. Repeating this operation by selecting rows/columns, the rotating process of the image data will be executed in real time.

Figure 2:
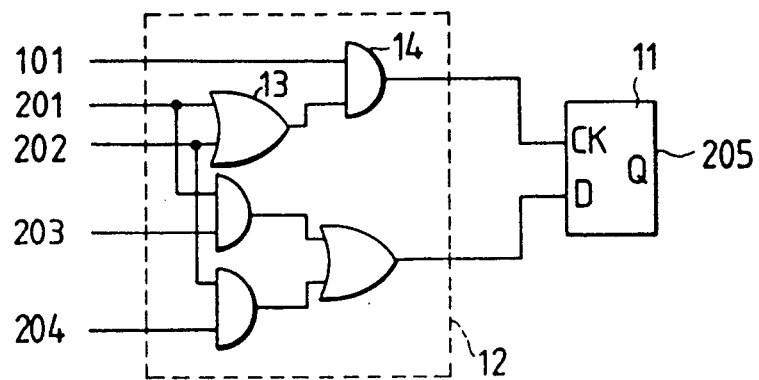
FIG. 2 shows an embodiment of a part of the data rotating circuit shown in FIG. 1.

FIG. 2 illustrates a cell 11 of the matrix memory 1, which positions at the k-th row and the l-th column thereof (1≦k, 1≦n), and a block 12 of the row/column selector 2 corresponding to the cell 11. In FIG. 2, the cell 11 is shown as a latch circuit (using, for example, a flip-flop circuit), the block 12 is constructed by OR gates 13 and AND gates 14. The block 12 of the row/column selector 2 receives the write clock 101, a k-th row select signal 201, an l-th column select signal 202, an l-th bit input data 203, and a k-th bit input data 204. By function of the OR gate 13 and the AND gate 14, when the k-th row select signal 201 or the l-th column select signal 202 is delivered to the block 12, the write clock 101 is supplied to the cell 11, that is, the k-th row and l-th column of the matrix memory 11. Also, when the k-th row select signal 201 is delivered, the l-th bit input data 203 is provided to the cell 11 as input data, and when the l-th column select signal 202 is input, the k-th bit input data 204 is provided to the cell 11 as the input data. Therefore, the data of the cell 11 is re-written.

Further, since an output 205 of the cell 11, that is, a Q output of the latch circuit, is constantly provided to the input terminal of the output selector 3, when the k-th row is selected, data of the l-th bit is output as one bit of the n bit output, and when the l-th column is selected, data at the k-th bit is output as one bit of the n bits of data.

Figure 3:
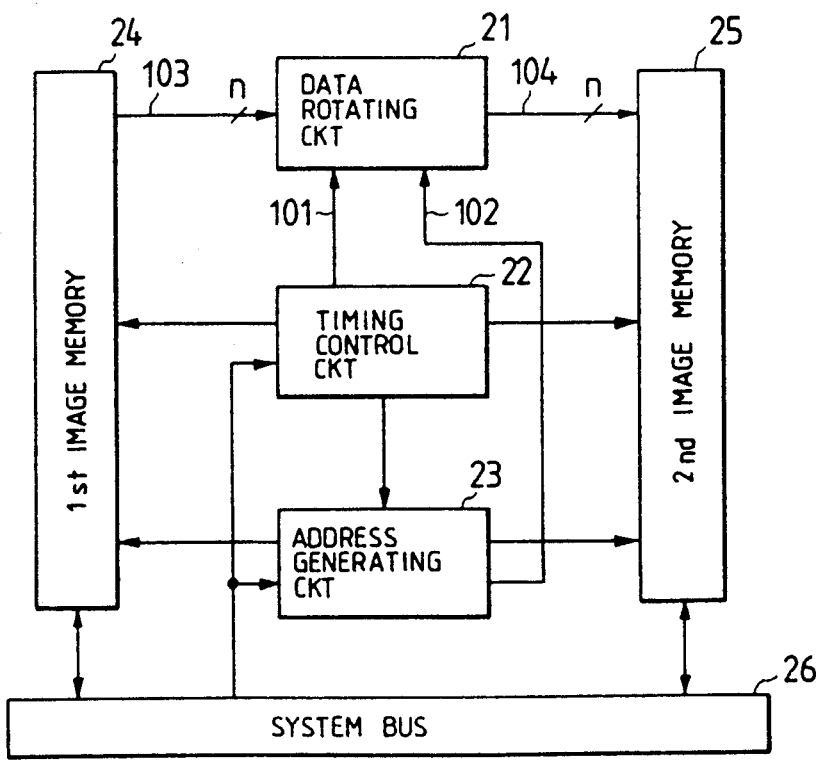
FIG. 3 shows an embodiment of system structure using the data rotating circuit of the present invention.

FIG. 3 shows an embodiment of a system structure of the present invention. In FIG. 3, the numeral 21 denotes the data rotating circuit explained by FIG. 1. The numerals 24 and 25 designate a first image memory and a second image memory, respectively. Image data which has not been rotated yet is stored in the first image memory 24. When an instruction for the rotating operation is sent to a timing control circuit 22 and an address generating circuit 23 via a system bus 26, the timing control circuit 22 generates control signals for the address generating circuit, the first and second image memories 24 and 25, and the write clock 101 for the rotating circuit 21, and the address generating circuit 23 generates addresses of the image memories 24 and 25, and the row/column select signal 102 for the data rotating circuit 21.

As a result, the contents of the first image memory 24 are divided into a plurality of n×n dots matrix, separately rotated by the data rotating circuit 21, and stored into the second image memory 25.

Figures 6A, 6B:
FIGS. 6A and 6B illustrate data elements stored in the matrix memory for explaining a left 180° rotation of data in the present invention.
Figures 7A, 7B, 7C:
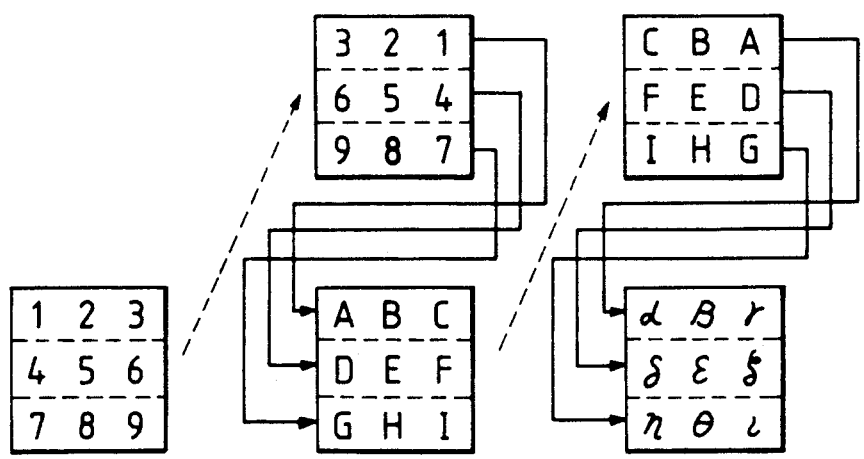
FIGS. 7A to 7C illustrate a read/write operation of the data elements shown in FIGS. 6A and 6B, FIGS. 8A and 8B illustrate data elements stored in the matrix memory for explaining a left 270° rotation of data in the present invention.

Next, a case, in which a rotating degree is selected from left 180° or left 270° (i.e., right 90°), will be explained hereinafter. FIGS. 6A and 6B illustrate the original image data and the left 180° rotated image data, respectively. Namely, the original image data shown in FIG. 6A have to be re-arranged into the image data shown in FIG. 6B by a left 180° rotation. For example, three word data "123", "456", and "789" must be re-arranged into "321", "654", and "987". In the former embodiment shown in FIG. 1, the image data is stored in the n×n dot matrix memory 1 as shown in FIG. 7A. Next, in a read-modify-write mode, the image data "321", "654", and "987" are output by an upside down read out and "ABC", "DEF", and "GHi" are stored as shown in FIG. 7B. In this specification, "upside down read out" means a read out with reversing of the data order in each word. By repeating this operation as shown in FIG. 7C, the 180° rotation will be executed in real time by the n×n dot matrix memory.

Figures 8A, 8B, 9A, 9B, 9C:
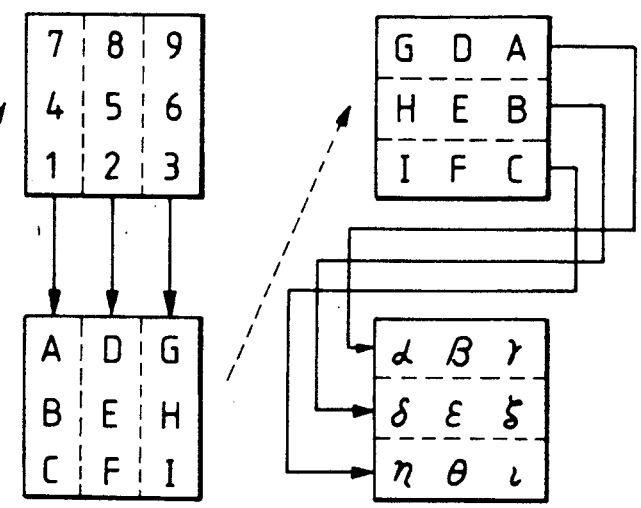
FIGS. 9A to 9C illustrate a read/write opration of the data elements shown in FIGS. 8A and 8B.

Further, FIGS. 8A and 8B illustrate the original image data and the right 90° rotated image data, respectively. Namely, the image data shown in FIG. 8A must be re-arranged into the image data shown in FIG. 8B. Three word data "123", "456", and "789" have to be re-arranged into "741", "852", and "963". In the previous embodiment shown in FIG. 1, the image data is written in the row direction of the n×n dots matrix memory 1 as shown in FIG. 9A. Next, the read-modify-write operation is executed with the access to the vertical direction and the upside down read out, so that "741", "852", and "963" are read out and "ABC", "DEF", and "GHi" are stored as shown in FIG. 9B. Further, the read-modify-write is executed with the access to the horizontal direction and the upside down read out, so that "GDA", "HEB", and "iFC" are output and "αβγ", "δεζ", and "ηθι" are stored. By repeating these operations, the right 90° rotation is executed in real time and by the n×n dot matrix memory.

Basically, the embodiments shown in FIGS. 1, 2, and 3 can be used for rotating the data by the left 180° or right 90° rotation. In the above explanation, it is necessary to add a function of the upside down read out to output selector 3 in FIG. 1. Namely, the output selector 3 might be configured to select upside down data (having a reverse order of 1−n bits data) as the output data in response to a select signal which is included in the row/column select signal 102. That is, in FIG. 1, since the Q outputs of the latch circuits are constantly provided to the input terminals of the output data selector 3, when the k-th row is selected and the upside down read out is indicated, data of the (n+1−l)-th bit is output as one bit of the n bit output, and when the l-th column is selected and the upside down read out is selected, data at the (n+1−k)-th bit is output as one bit of the n bit output.

Further, an embodiment of an application system of the present invention will be explained with FIG. 10, which shows an electronic filing system using a rotatable cathode ray tube (CRT) display. In this system, an image being long in the vertical direction, which is stored as image data in a video memory (a frame memory) 27, is displayed in a longitudinal position of the CRT. In contrast, an image being long side by side is displayed in a horizontal position of the CRT.

Figure 10:
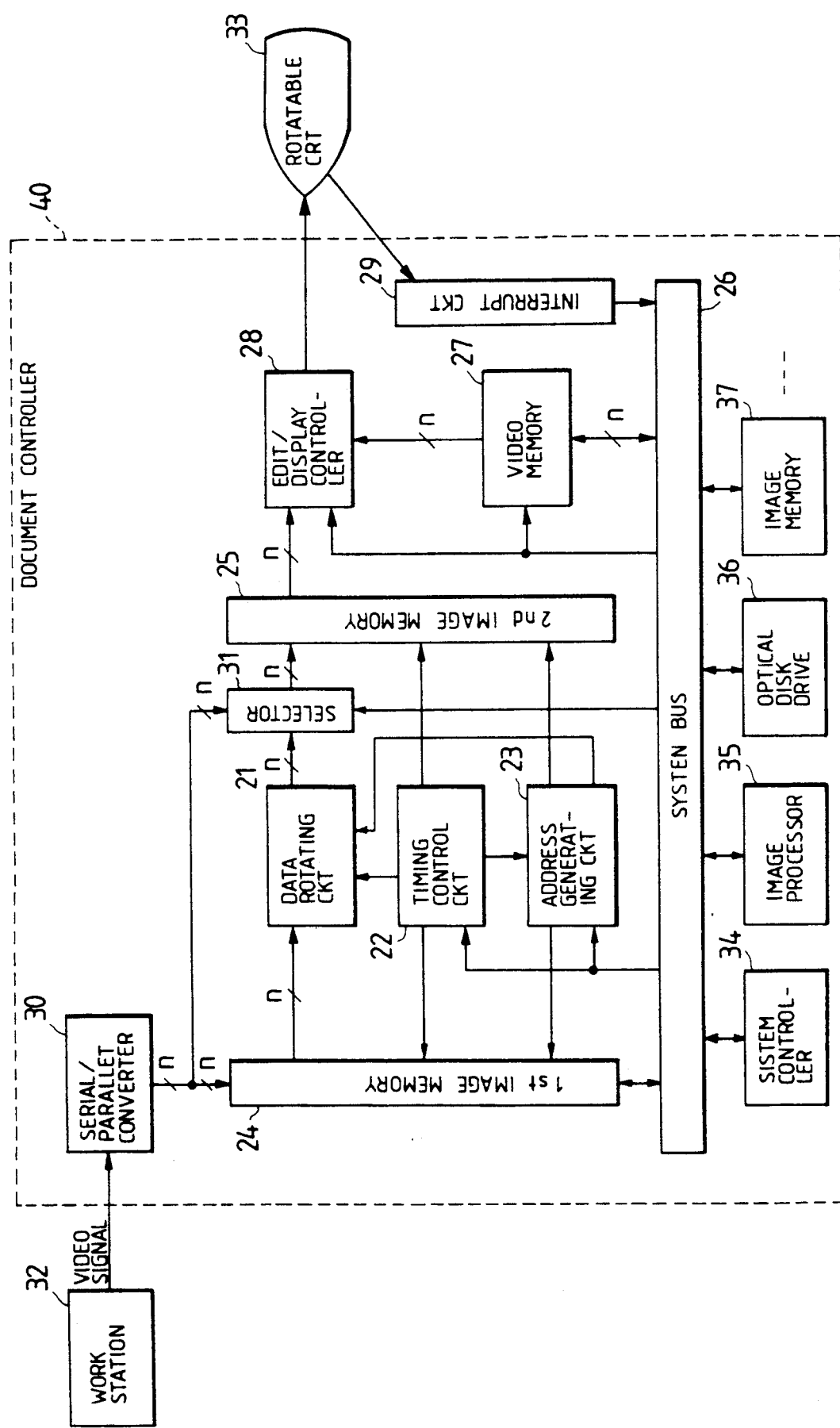
FIG. 10 shows an embodiment of an electronic filing system using the data rotating circuit of the present invention.

In FIG. 10, a document controller 40 includes the system structure shown in FIG. 3. The first image memory 24 receives a parallel image data (n bits) from a serial/parallel converter 30, which converts a serial video signal transmitted from a work station terminal 32 into an n bits of parallel data. The document controller 40 produces the image data displayed at a rotatable CRT 33. The rotatable CRT 33 has two positions, one of which is a horizontal position, and another of which is a longitudinal position. An operator selects one of the two positions at his discretion in accordance with the image stored in the video memory 27.

If the operator rotates the rotatable CRT 33, an interrupt signal is sent to a system controller 34 via an interrupt circuit 29 and the system bus 26, so that the system controller 34 generates a select signal in response to the CRT position and sends it to a selector 31, which selects the n bits of output data from the serial/parallel converter 30 or the n bits of output data from the data rotating circuit 21. The selected n bits of output data are stored in the second image memory 25. In FIG. 8, the remaining numeral 28 denotes an edit/display controller. Further, the numerals 35, 36, and 37 designate an image processor, an optical disk drive, and an optical image memory, respectively, which constitute a part of the electronic filing system.

As apparent from our former U.S. application Ser. No. 186,162, the image data from the work station terminal 32 is superimposed on the data stored in the video memory 37. Since the image data is rotated in response to the CRT position prior to the superimposition, the image from the work station can be superimposed in a correct position with respect to the operator regardless of the CRT postion.

What is claimed is:

1. An apparatus for rotating n×n dots of data m×90°, where m is an integer, said apparatus comprising:

matrix memory means including n×n dot matrix memory cells for storing the n×n dots of data;
   clock signal means for applying a cyclic clock signal to said matrix memory means;
   select means for selecting a row or column of said n×n dot matrix memory cells of said matrix memory means; and
   changing means for changing n dots of data stored in said selected row or column of said matrix memory means by outputting said n dots of data from said selected row or column to a location which is external from said matrix memory means and by inputting another n dots of data into said selected row or column from a location which is external from said matrix memory means in the same cycle of said clock signal.

2. An apparatus for rotating n×n dots of data according to claim 1, wherein:
   said changing means changes said n dots of data by a read-modify-write access of said matrix memory means.

3. An apparatus for rotating n×n dots of data according to claim 1, further comprising:
   first image memory means for storing image data, said image data being divided into a plurality of matrices of n×n dots of data to be inputted into said matrix memory means; and
   second image memory means for storing said n dots of data outputted from said selected row or column in each cycle.

4. An apparatus for rotating n×n dots of data according to claim 1, wherein:
   said n×n dot matrix memory cells are n×n flip-flops arranged in a matrix.

5. An apparatus for rotating image data supplied from an external circuit m×90°, where m is an integer, said apparatus comprising:
   first image memory means for storing the image data supplied from the external circuit;
   data rotating means connected to said first image memory means for rotating the image data and a write clock for applying a cyclic clock signal to said data rotating means, said data rotating means including matrix memory means having n×n dot matrix memory cells for storing n×n dots of image data, and select means connected to said matrix memory means for selecting a row or column of said n×n dot matrix memory cells of said matrix memory means in response to an address signal;
   changing means for changing n dots image data stored in said selected row or column of said matrix memory means of said data rotating means by outputting said n dots of image data from said selected row or column to a location which is external from said matrix memory means and by inputting another n dots of image data into said selected row or column from a location which is external from said matrix memory means in the same cycle of said clock signal;
   second image memory means connected to said data rotating means for receiving said n dots of image data outputted from said selected row or column;
   address generating means for generating said address signal and memory address signals for said first image memory means and said second image memory means; and
   timing control means for generating control signals for said first image memory means, said second image memory means and said address generating means.

6. An apparatus for rotating n×n dots of image data according to claim 5, wherein:
   said n×n dot matrix memory cells include n×n matrix-arranged flip-flop circuits.

7. An apparatus for rotating n×n dots of image data according to claim 5, further comprising:
   serial/parallel converter means for converting a video signal into n dots of parallel image data to be stored in said first image memory means.

8. An apparatus for rotating n×n dots of image data according to claim 7, further comprising:

selecting means connected to said serial/parallel converter means and said data rotating means for selecting outputs of said serial/parallel converter means and said data rotating means in response to a select signal.

9. An apparatus for rotating n×n dots of image data according to claim 8, further comprising rotatable display means for displaying said n dots of image data stored in said second image memory means, wherein:

said select signal is generated in accordance with a position of said rotatable display means.

10. A method for rotating image data by m×90°, where m is an integer, the method comprising the steps of:

applying a cyclic clock signal to n×n dot matrix memory means for storing image data;

storing the image data in said n×n dot matrix memory means;

selecting a row or column of said n×n matrix memory means in accordance with a rotating order; and changing n×n dots of image data stored in said matrix memory means by outputting image data from said selected row or column of said matrix memory means to a location which is external from said matrix memory means and inputting other image data into said selected row or column from a location which is external from said matrix memory means in each cycle of said clock signal in response to said rotating order.

11. An apparatus for rotating two-dimensional dot data m×90°, where m is an integer, said apparatus comprising:

first data memory means for storing dot data supplied from an external circuit;

data rotating means connected to said first data memory means for rotating dot data transferred from said first data memory means and clock signal means for applying a cyclic clock signal to said data rotating means, said data rotating means including matrix memory means having n×n dot matrix memory cells for storing n×n dot data transferred from said first data memory means, and select means connected to said matrix memory means for selecting a row or column of said n×n dot matrix memory cells in response to a select signal in order to output n dot data stored in said selected row or column to a location which is external from said matrix memory means and to write other n dot data inputted from said first data memory means into said selected row or column in the same cycle of said clock signal;

second data memory means connected to said data rotating means for receiving said n dot data outputted from said selected row or column;

address generating means for supplying memory address signals to said first data memory means and said second data memory means, and for supplying said select signal to said data rotating means; and timing control means for generating control signals for said first data memory means, said data rotating means, said second data memory means and said address generating means.

12. An apparatus for rotating two-dimensional dot data according to claim 11, wherein:

said select means read and write said n dot data by a read-modify-write access.

13. An apparatus for rotating two-dimensional dot data according to claim 11, wherein:

said n×n dot matrix memory cells are n×n flip-flops.

14. A method for rotating two-dimensional data m×90°, where m is an integer, the method comprising the steps of:

storing the two-dimensional data to be rotated in first data memory means for storing data;

buffering n×n dot data read out from said first data memory means in n×n dot matrix memory cells;

applying a cyclic signal to said n×n dot matrix memory cells;

reading n dot parallel data from a sequentially selected row or column of said n×n dot matrix memory cells to a location which is external from the matrix memory cells in a first cycle of said cyclic signal;

writing new n dot parallel data inputted from said first data memory means in said sequentially selected row or column of said n×n dot matrix memory cells in the first cycle of said cyclic signal; and sequentially storing said n dot parallel data read from said n×n dot matrix memory cells in second data memory means for storing data so as to produce rotated two-dimensional data.

15. A method for rotating two-dimensional data according to claim 14, wherein:

said reading and writing steps are executed by a read-modify-write access of each sequentially selected row or column.

* * * * *